(No Model.)
A. WOEBER.
RAKE OR BROOM.
No. 566,048. Patented Aug. 18, 1896.
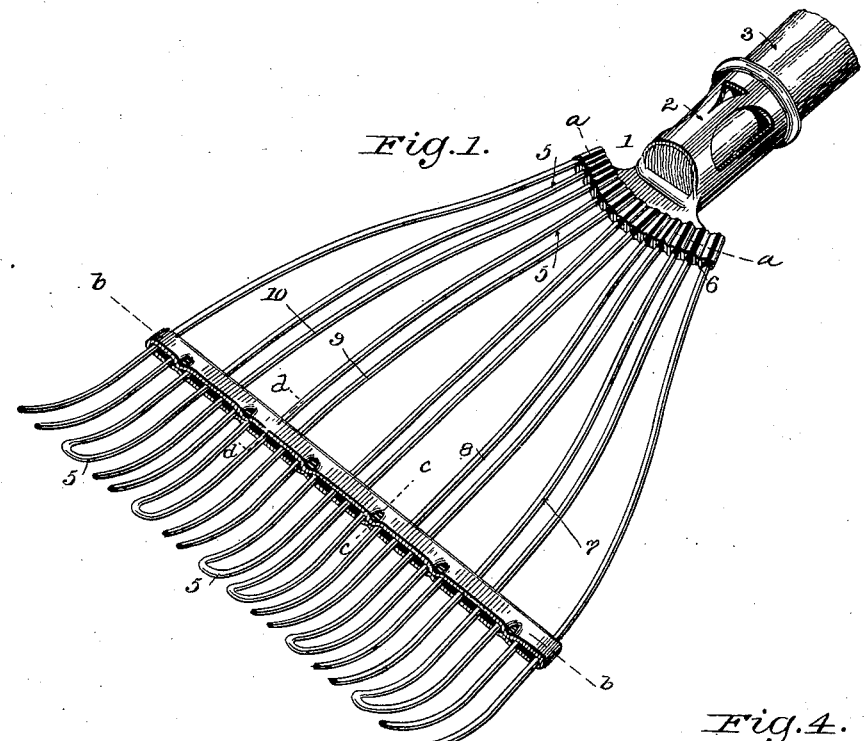
Fig. 1.
Fig. 4.
On line d-d.
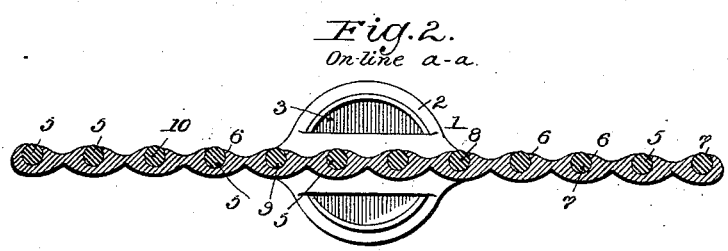
Fig. 2.
On line a-a.
Fig. 3.
On line b-b.
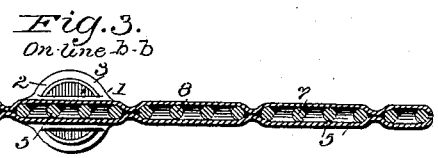
WITNESSES
Arthur Ashley
W. R. Kennedy
Fig. 5.
On line c-c.
INVENTOR
Amos Woeber
By P. Y. Dodge
Attorney

UNITED STATES PATENT OFFICE.

AMOS WOEBER, OF MOLINE, ILLINOIS.

RAKE OR BROOM.

SPECIFICATION forming part of Letters Patent No. 566,048, dated August 18, 1896.

Application filed October 3, 1895. Serial No. 564,500. (No model.)

*To all whom it may concern:*

Be it known that I, AMOS WOEBER, of Moline, county of Rock Island, and State of Illinois, have invented a new and useful Improvement in Rakes or Brooms, of which the following is a specification.

My invention has reference to a device designed for use more particularly as a broom or rake for lawns and embodying a head adapted to be connected to a suitable handle and having extended therefrom a series of metallic tines or bars arranged side by side with spaces between them.

The invention consists in the manner of connecting the tines and the head, in the manner of spacing and sustaining the tines near their active ends, in the provision of guards to prevent the ends of the tines from penetrating too far into the ground, and in various details of construction in combination of parts hereinafter described and claimed.

In the accompanying drawings, Figure 1 is a perspective view of my improved lawn broom or rake. Fig. 2 is a transverse section of the same on the line $a\ a$. Fig. 3 is a similar section on the line $b\ b$. Figs. 4 and 5 are longitudinal sections on the lines $d\ d$ and $c\ c$, respectively.

Referring to the drawings, my improved broom consists of a head 1, having projected rearwardly therefrom a socket 2 for the reception of a handle 3. The head is preferably of segmental form, and is provided on its upper side with a series of radially-extended grooves or sockets adapted to receive the rear ends of a series of tines 5 in the form of metallic wires, the ends of the tines being held firmly in the sockets by lips 6, constituting the walls of the sockets, which lips are bent laterally and downward on the tines. From the head the tines extend forward and outward side by side through a cross-bar 7, formed of sheet metal bent longitudinally into U shape, the tines extending between the two side walls of this bar and through the wall connecting them. A short distance beyond the bar the tines are bent backward upon themselves, whence they extend rearward between the side walls of the bar, at which point they are again bent forward and terminate in line with the first bends. The side walls of the cross-bar are bent inward on the curved portion of the tines extending between them, and in this manner the tines are held firmly at the proper distances apart and rigidly in position as far as their lateral movement is concerned. As a result of this particular manner of bending the outward ends of the tines, the active edge of the broom will be made up of a series of straight sharp teeth and a series of alternate guard-teeth formed by the backward bend of the tine. These guard-teeth serve to prevent the straight teeth from extending to an objectionable distance into the ground and thereby interfering with the proper action of the broom. I propose to provide additional tines between these straight and curved teeth already described, as represented at 7 8 9 10, &c., these additional tines being straight at their outer ends and terminating in sharp teeth similar to the ends of the curved tines. It will, of course, be understood that the arrangement of these teeth may be varied without departing from the limits of my invention in this respect, the essence of which resides in the combination, with the straight sharp teeth, of guard-teeth located adjacent thereto and of such form as to prevent the sharp teeth from penetrating too far into the earth.

In assembling the parts of a broom or rake of the foregoing construction, the tines, after being bent, as described, are passed through the cross-bar, and the latter has its walls bent at intervals on the curved portions of the tines extending between them, by which means they are firmly held in their proper positions. The rear ends of the tines are seated in the radial sockets formed in the head, each socket having its wall extended vertically in the form of a lip, and these lips are forced or bent downward on the tines and will serve to hold them securely and rigidly in position.

It will be observed that my improved rake is composed of but few parts, is of extreme simplicity, and possesses durability combined with lightness. It may be used effectively to rake the newly-cut grass from lawns, for raking the leaves and fine trash, also as a shovel or scoop or fork and as a pulverizer.

Having thus described my invention, I claim—

1. In a rake or broom the combination with the head, of a series of tines secured at their rear ends thereto, and extending forward and terminating in straight raking-teeth, and a series of alternate tines secured at their rear ends to the head extending forward parallel to the straight tines, bent backward at their forward ends on themselves to form guard-teeth and then bent again and extended forward to form straight teeth; whereby the active ends of the tines comprise pairs of straight teeth alternated by looped or guard teeth.

2. The combination with the head and the cross-bar formed with side walls and a rear connecting-wall, of the tines secured at their rear ends to the head and extending between the side walls and through the rear connecting-wall of the cross-bar.

3. The combination with the head, of a cross-bar comprising side walls joined by a connecting-wall, tines connected at their rear ends to the head and extending between the side walls and through the connecting-wall and bent backward on themselves and extending thence again between the side walls of the cross-bar, said walls being bent inward upon the tines to secure the same in place.

4. In combination with the head, the series of tines extending forward therefrom and terminating in straight teeth, the cross-bar comprising side walls and a connecting-wall, between and through which the tines extend, a second series of tines secured at their rear ends to the head and extending therefrom between the side walls of the cross-bar to a point in line with the ends of the first teeth, whence they are bent backward on themselves and extend between the side walls of the cross-bar, which latter are bent upon them to hold them in place, from which point the tines are extended again forward and terminate in straight teeth in line with those first named.

In testimony whereof I hereunto set my hand, this 9th day of September, 1895, in the presence of two attesting witnesses.

AMOS WOEBER.

Witnesses:
JOSEPH RAUK,
ADAM J. LEIPOLD.